Patented June 25, 1940

2,205,418

UNITED STATES PATENT OFFICE 2,205,418

PROCESS FOR THE PREPARATION OF DICHLOROINDANTHRONE

Francis Knowles, Wilmington, Del., and William Hiram Lycan, Milwaukee, Wis., assignors to E. I. du Pont de Nemours & Company, Wilmington, Del., a corporation of Delaware No Drawing. Application April 28, 1939, Serial No. 270,508

2 Claims. (Cl. 260—265)

This invention relates to the preparation of dichloroindanthrone.

N-Dihydro-1:2-2':1'-anthraquinone azine, commonly called indanthrene, or indanthrone, is a blue dyestuff that has been known for a number of years. This color however, suffers from the defect that it is not fast to bleach, such as chlorine, peroxide, etc., but because of its excellent light fastness a great deal of research has been expended in an attempt to improve its bleach fastness. It was found that by introducing halogen into the indanthrone molecule the shade of the color was altered only slightly but the bleach fastness was materially improved. A large number of patents have issued in the United States and foreign countries directed to various methods of introducing halogen in the indanthrone molecule to obtain dyestuffs which are alleged to be fast to bleach or to have improved bleach fastness properties. It was found that when bromine was introduced into the indanthrone molecule, at least in sufficient amount to render it relatively fast to bleach, the product becomes relatively insoluble in the vat and offers considerable difficulty in dyeing operations. Because of these difficulties with the brominated indanthrone, the fastness of indanthrone is generally enhanced by the introduction of chlorine. It was found that the method by which the chlorine is introduced into the indanthrone molecule, apparently because of the directing influence of the solvent or other reagents employed, had a decided effect on the resulting dyestuffs, for even though they all contain the same amount of chlorine, they do not all exhibit the same bleach fastness properties.

As disclosed in U. S. Patent 2,056,593, the maximum bleach fastness of indanthrone is obtained when two atoms of chlorine are introduced into the molecule when that chlorine is substantially all in the 3:3'-positions, and this patent is directed to the preparation of what is considered to be 3:3'-dichloroindanthrone by direct synthesis from 1-brom-2-amino-3-chloroanthraquinone.

It was also found, as disclosed in U. S. Patents 1,847,329 and 2,026,647, that a chlorinated indanthrone could be obtained by chlorinating indanthrone in nitrobenzene, or chlorobenzenes to a point where it contained from 15–30% chlorine and that this compound could be dechlorinated to a chloroindanthone containing from 10 to 14% chlorine. U. S. Patent 2,089,009 describes a process for selectively splitting off from the polyhalogenated indanthrone the extraneous halogen which apparently adds nothing to the bleach fastness of the dyestuffs yet which renders the dyestuffs sensitive to the vat, particularly where calcareous water is employed. It was found that apparently any of the methods previously used in the chlorination of indanthrone would finally saturate the 3:3'-position of the indanthrone molecule, provided sufficient chlorine was employed, although in some cases this required the introduction of from 3 to 5 atoms of chlorine into the molecule. All of the chlorine that was not in the 3,3'-positions, which we call extraneous chlorine, was then split off by a dehalogenation process. No process has heretofore been found by which only two atoms of chlorine could be introduced into the indanthrone molecule by direct chlorination that would give a chlorinated indanthrone of the bleach fastness of the product of U. S. Patent 2,056,593 which is prepared by direct synthesis from the 1-brom-2-amino-3-chloroanthraquinone.

It is therefore, an object of this invention to provide a simple and economical process for the preparation of a dichloroindanthrone which has a bleach fastness substantially equal to that of the 3,3'-dichloroindanthrone of U. S. Patent 2,056,593.

It is a further object of the invention to provide a method for the direct chlorination of indanthrone to give a dichloroindanthrone which has a bleach fastness equal to that of the directly chlorinated indanthrones heretofore prepared which have a chlorine content of from 17.5–18%.

According to the present invention indanthrone may be chlorinated directly to the dichloroindanthrone stage in nitrobenzene when iron is used as a catalyst, and the resulting dichloroindanthrone has a bleach fastness equal to that heretofore obtained by direct synthesis. The chlorination is effected at temperatures preferably of from 30 to 175° C. Ordinarily when indanthrone is chlorinated in nitrobenzene in the absence of iron it is necessary to introduce approximately 17% of chlorine into the molecule before the resulting product has a bleach fastness approaching that of the synthetically prepared 3,3'-dichloroindanthrone. When iron is added as a catalyst the chlorination proceeds directly to a dichloroindanthrone stage giving a compound that exhibits maximum bleach fastness. When the chlorination is carried out at temperatures of from 80 to 175° C., in the presence of an iron catalyst the chlorination proceeds rapidly to a chlorine content of from 13.4 to 14.2%, at which point the chlorination slows down very noticeably and it is difficult to introduce additional chlorine into the molecule under these conditions. The bleach fastness of the product is equal or superior to the product previously obtained by chlorination to 17–18%. The product prepared according to this invention appears to contain very little loosely bound or extraneous chlorine, for there is only a slight loss of chlorine from the product on acid pasting or on vatting by the procedure described in U. S. Patent 2,089,009.

Iodine may be employed as an additional catalyst in the reaction if desired although it is not a substitute for the iron, for when iodine alone is used as the catalyst the chlorination of the indanthrone must be carried to about 17.5% before a product of maximum bleach fastness is obtained.

The following examples are given to illustrate the invention. The parts used are by weight.

*Example 1*

100 parts of indanthrone (Color Index No. 1106) are charged into 1000 parts of dry nitrobenzene, 1.0 part of iron powder and 0.5 part of iodine crystals are added. Chlorine gas is passed into the suspension starting at room temperature, at a slow and uniform rate, until a sample shows a chlorine content of 13.8–14.3%. During the chlorination the temperature rises to about 42° C. This reaction requires from 10–12 hours. After the desired chlorine content has been obtained 50 parts of soda ash are added and the mass is filtered and washed with 300 parts of warm nitrobenzene. The cake is steam distilled free from nitrobenzene, filtered and washed alkali free, and then boiled ½ hour with 1500 parts of 10% sulfuric acid in order to remove the iron present. The dichlorinated indanthrone is isolated by filtration, washed acid free and dried.

The bluish green product thus obtained has a chlorine content of 14.1%. On solution in concentrated sulfuric acid, reduction with hexalin and dilution with water, a blue precipitate is obtained. The paste so obtained dyes cotton goods from an alkaline hydrosulfite vat a blue shade, exhibiting a bleach fastness similar to the known 3,3′-dichloroindanthrone. The chlorine content after acid pasting is 12.2%.

*Example 2*

100 parts of indanthrone are charged into 1000 parts of dry nitrobenzene, and 1.0 part of iron powder and 0.5 part of iodine crystals are added. The temperature is raised to 70–75° C. and the dyestuff chlorinated and isolated as in Example 1.

The product has a chlorine content of 13.5% which on acid pasting is reduced to 13.1%.

*Example 3*

100 parts of indanthrone are charged into 1000 parts of dry nitrobenzene, and 1.0 part of iron powder and 0.5 part of iodine crystals are added. The temperature is raised to 95–100° C. and the dyestuff chlorinated and isolated as in Example 1. The resulting product which has a chlorine content of 14.0% on acid pasting gives a dyestuff containing 13.4% chlorine, which when dyed exhibits fastness properties equal to the dyestuff formerly produced by chlorination in nitrobenzene to a chlorine content of 17.5–18%.

*Example 4*

100 parts of indanthrone is charged to 1000 parts of dry nitrobenzene, and 1.0 part of iron powder and 0.5 part of iodine crystals are added. The temperature is raised to 120–125° C. and the dyestuff chlorinated and isolated as in Example 1. The resulting product has a chlorine content of 13.85% which on acid pasting is reduced to 13.1%. It exhibits the fastness properties of the products of the previous examples.

*Example 5*

100 parts of indanthrone are charged to 1000 parts of dry nitrobenzene, and 1.0 part of iron powder and 0.5 part of iodine crystals are added. The temperature is raised to 150–155° C. and the dyestuff chlorinated and isolated as in Example 1. The resulting product has a chlorine content of 13.7% which is reduced to 13.25% on acid pasting, and exhibits the good fastness properties of the products of the previous examples.

*Example 6*

100 parts of indanthrone are charged to 1000 parts of dry nitrobenzene, and 1.0 part of iron powder and 0.5 part of iodine crystals are added. The temperature is raised to 180–185° C. and the dyestuff chlorinated and isolated as in Example 1. The resulting product has a chlorine content of 13.6% and exhibits excellent fastness properties.

*Example 7*

100 parts of indanthrone are charged to 1000 parts of dry nitrobenzene and 1.0 part of iron powder and 0.5 part of iodine crystals are added. The temperature is raised to 205–210° C. and the dyestuff chlorinated and isolated as in Example 1. The product containing 13.85% chlorine exhibits good fastness properties.

*Example 8*

100 parts of indanthrone is charged to 1000 parts of dry nitrobenzene, and 1.0 part of iron powder is added. The temperature is raised to 95–100° C. and chlorine gas passed in at a slow and uniform rate, until a sample removed from the reaction shows a chlorine content of 13.8–14.3%, which requires, on the average, from 10–12 hours. After the desired chlorine content is obtained 50 parts of soda ash are added and the mass is filtered and washed with 300 parts of warm nitrobenzene. The cake is steam distilled free from oil, filtered and washed alkali free, and then boiled ½ hour with 1500 parts of 10% sulfuric acid in order to remove the iron present. The chloroindanthrone isolated by filtration, washed acid free and dried, contains 13.6% chlorine and exhibits the good bleach fastness of the products of the above examples.

Although in the above examples chlorine gas has been used to illustrate the invention, it is to be understood that other chlorinating agents such as sulfuryl, thionyl, and oxalyl chlorides, etc., may be employed. Although the reaction is preferably carried out at temperatures of from 30 to 175° C., higher temperatures may be employed with a loss in yield of the 3,3′-dichloroindanthrone.

Iron salts may of course be employed in place of the iron used in the specific examples for in the presence of chlorine the iron is converted to ferric chloride in the reaction, and in the claims the term iron is used to cover that element irrespective of the form in which it may have been added to the reaction mass.

While it cannot be definitely stated that the chlorine in these products is all in the 3,3'-position, the products obtained by the present process exhibit dyeing and bleaching fastness properties substantially identical to the dichloroindanthrone prepared by direct synthesis from 1-brom-2-amino-3-chloroanthraquinone and is therefore considered to be a substantially pure 3,3'-dichloroindanthrone.

By the use of iron in the heretofore known process for chlorinating indanthrone in nitrobenzene, over-chlorination and subsequent dechlorination, of the over-chlorinated product is obviated and a dichloroindanthrone is obtained having maximum bleach fastness.

We claim:

1. In the process for preparing dichloroindanthrone by direct chlorination of indanthrone in nitrobenzene as a solvent, the step which comprises carrying out the chlorination in the presence of iron as a catalyst.

2. The process for preparing a dichloroindanthrone which comprises reacting indanthrone with chlorine in nitrobenzene as the solvent and in the presence of iron as a catalyst at temperatures of from 30 to 175° C.

FRANCIS KNOWLES.
WILLIAM HIRAM LYCAN.